Dec. 17, 1940.   A. O. AUSTIN   2,224,853
METHOD OF MANUFACTURING CERAMIC OR VITREOUS WARE
Original Filed June 22, 1935   2 Sheets-Sheet 1

INVENTOR
Arthur O. Austin

Dec. 17, 1940.   A. O. AUSTIN   2,224,853
METHOD OF MANUFACTURING CERAMIC OR VITREOUS WARE
Original Filed June 22, 1935   2 Sheets—Sheet 2

INVENTOR
Arthur O. Austin

Patented Dec. 17, 1940

2,224,853

UNITED STATES PATENT OFFICE 2,224,853

METHOD OF MANUFACTURING CERAMIC OR VITREOUS WARE

Arthur O. Austin, near Barberton, Ohio

Substitute for abandoned application Serial No. 27,897, June 22, 1935. This application October 26, 1939, Serial No. 301,450

24 Claims. (Cl. 25—157)

My invention relates to improved methods of firing or burning ceramic or vitreous materials. One object of the invention is to eliminate dielectric breakdowns due to internal faults, checks or flaws in porcelain or other vitreous insulators.

Another object is to eliminate the dielectric weakness due to internal voids formed in the casting process when applied to forming dielectrics.

Another object is to provide insulators with improved electrical characteristics for operation under fog or severe line conditions.

Another object is to permit the manufacture of spark plugs having improved characteristics.

Another object is to provide improved firing or burning conditions for vitreous ware so as to reduce losses or increase the firing range.

Another object is to provide improved firing conditions so as to permit the economic use of materials which will improve the mechanical and electrical properties of the insulators or vitreous articles.

Another object is to control the firing conditions so as to reduce losses due to unequal temperatures or due to the pressure produced by vaporization of moisture in the articles being fired.

Another object is to provide greater latitude for the use of glazes which mature materially in advance of the body composition.

Another object is to provide improved manufacturing conditions for fused insulators.

Another object is to provide improved firing conditions for the elimination of free and combined carbon in ceramic bodies during firing operations.

Another object is to provide methods which will decrease the time and cost of firing.

Another object of the invention is to reduce the amount of material required in the construction of insulators without impairing the electrical properties.

Another object of the invention is to supply heat to the article by controlling the combustion of included fuel.

Other objects and advantages will appear from the following description.

The invention is exemplified by the combination and arrangement of parts shown in the accompanying drawings and described in the following specification, and it is more particularly pointed out in the appended claims.

This application is a substitute for applicant's abandoned application Serial No. 27,897.

The invention has several distinct advantages which apply particularly to insulators or vitreous materials. Parts of the process may be applied very effectively to other materials such as tile, brick, enamels, and other ceramic materials. The method is particularly valuable as it eliminates losses from internal defects in high voltage insulators and permits the construction of designs having greatly improved results not possible with the methods now in use.

The advantages of the method will be more readily seen by first discussing several of the figures.

Figures 1, 2, 3, 4, 5:
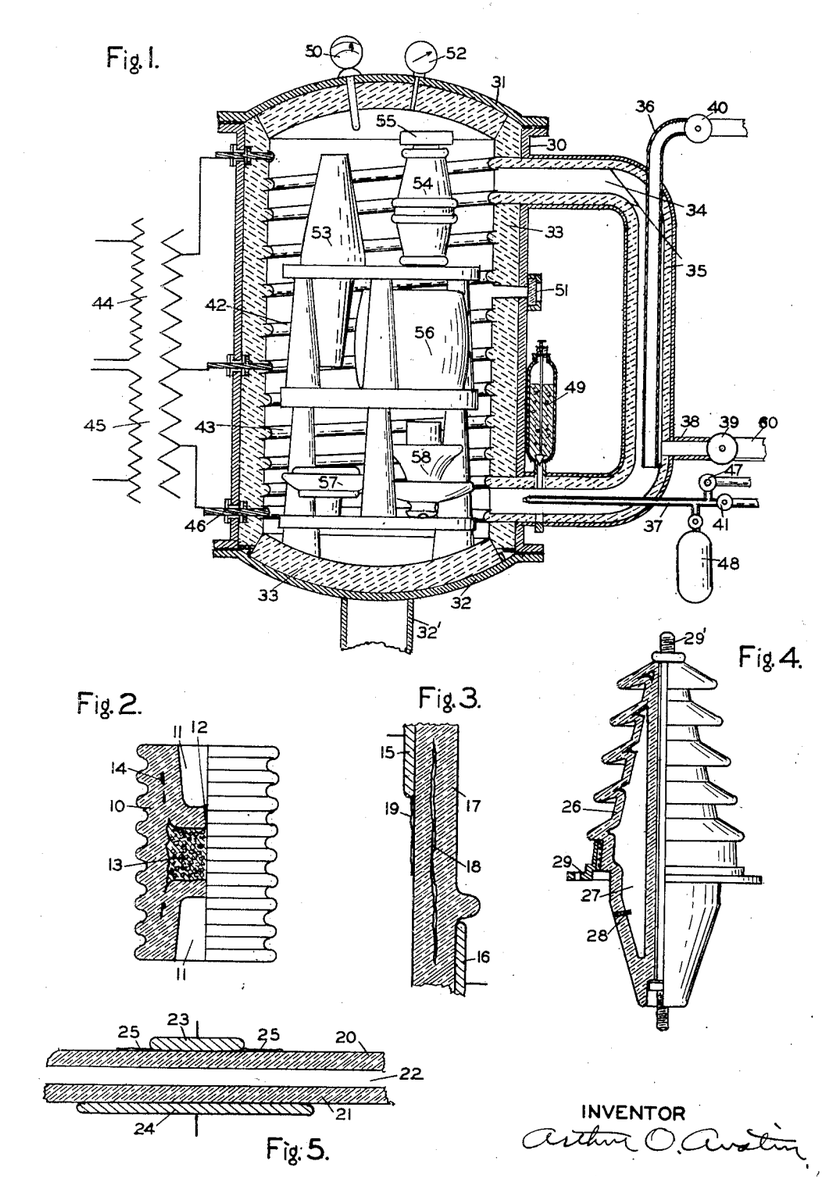
Fig. 1 is a fragmentary, vertical, sectional view of a film or furnace for firing or burning ceramic materials.
Fig. 2 is a part section, part elevation of an insulator.
Fig. 3 is a section of an insulator showing an internal fault.
Fig. 4 is a part section, part elevation of a high voltage bushing.
Fig. 5 is a section of an insulator containing a space between the solid dielectric.

Fig. 2 shows the porcelain for a bus insulator. The dielectric body 10 has recesses 11 for the insertion of metal fittings used for supporting the bus insulator and the bus or conductor. In the casting operation slip is poured into the molds or forms in the usual way. As the water is absorbed by the molds or forms a layer of solid material builds up. However, since the water increases the volume occupied by the solid material a void or space 13 and 14 will remain after the piece is formed.

The size of the pocket or space 13 can be readily regulated by the amount of water in the slip or by draining out excess slip after the wall reaches the desired thickness. The hole 12 through which the excess slip is drained is easily sealed by a small amount of slip which is allowed to remain, by glaze, or by inserting a plug which will form a tight seal during the firing operation. Most insulator sections are such that a porous center or core will be obtained in the casting operation. This is caused by the shrinkage in volume of the entrapped slip due to the absorption of water. A large shrinkage in the volume of the entrapped slip may permit the walls to collapse due to atmospheric pressure unless the casting operation is carried out in a partial vacuum or at an increased temperature.

In the casting process there is a tendency for the fine material to form a dense outer layer or shell with the coarser particles toward the center. This tends to limit the casting operation for insulators, but with my improved process it can be used to advantage. One method of preventing the collapse of the walls is to start the casting operation with slip having finely ground material and then finishing the operation by feeding in material which has coarser particles. The slip having the coarser particles, although containing considerable water, will have reduced shrinkage. This reduced shrinkage on the part of the material in the center of the piece will support the outer walls and prevent collapse of the piece during the forming or drying operations.

The wall thickness at different points may be controlled by the porosity or absorption of the adjacent surface of the mold, and by pressure or vacuum. The collapse of the walls of cast pieces due to the reduction in volume of the entrapped slip is easily prevented by casting and hardening in a partial vacuum. This eliminates the necessity of venting the piece. Since the pockets or porous centers of insulators do not constitute a weakness with my process, the casting method may be used to advantage for reasons which will appear later.

In firing or burning most porcelain insulators a temperature of 1300° to 1500° C. is reached. At this temperature the gas is greatly expanded in accordance with well-known laws. In porcelain or other body compositions used for insulators it is necessary to produce a dense body in order that the insulators will have the necessary dielectric strength. The density is produced by a shrinkage of the body composition during the firing operation. The fusion and melting of the materials making up the body composition is such that the pore spaces are largely eliminated or sealed. Since the sealing of the pore spaces takes place at or near the highest temperatures reached in the firing operation, it is evident that the density of gas in any pore space or in any pocket formed by the walls of the material making up the insulator will be determined by the temperature at the time the pore spaces are sealed.

Since the density of air or gas varies inversely as the absolute temperature and directly as the pressure, the density of the air or gas in pores or pockets which are sealed at high temperatures can be readily determined for other temperatures. The value of controlling the density of the air or gas in the pore spaces or in pockets formed by the dielectric is readily seen by the following. A temperature of 1350° C. corresponds to a temperature of 1623° C. above absolute zero. A normal operating temperature of 20° C. corresponds to a temperature of 293° C. above absolute zero. Since the density will be inversely proportional to the absolute temperature where the pressure remains the same, the density of the air or gas in the pore spaces at 1350° C. compared to that at 20° C. will be $$\frac{293}{1623}$$

or 18.2%.

Gas or air at normal temperature and atmospheric pressure of approximately 14.7# per square inch has a dielectric strength of approximately 30,000 volts per centimeter. Since the dielectric strength is proportional to the density a reduction of the density to 18.2% will reduce the dielectric strength accordingly or to 5,460 volts per centimeter. This reduced dielectric strength for the included air or gas generally constitutes a dielectric weakness. This dielectric weakness may cause the insulator to fail on dielectric test, under operating conditions, or constitute a limitation upon the manufacturing processes and design of insulators. With my improved method this weakness is eliminated by controlling the density of air or gas in the furnace before the pore spaces or walls of the insulator are sealed so that the desired density will be obtained in the pore space or in sealed pockets for normal operating temperatures.

In order to obtain a density in the gas or air corresponding to normal air density at 14.7# it will be necessary to seal the pores with an absolute pressure of approximately 81#, or a gauge pressure of 66.3#. By closing the pore spaces at 81# absolute pressure the dielectric strength of the spaces in the ware at 20° C. will be increased from 5,460 volts per centimeter to 30,000 volts per centimeter.

Since porcelain or other ceramic materials used for insulators have good mechanical strength it is evident that insulators may be so designed and fired that the pore spaces and air or gas pockets may be used to advantage in increasing the dielectric strength of the insulator and in improving the electrical performance particularly for high voltages. To increase the density of the air or gas in the pore spaces to ten times that corresponding to a pressure of 14.7# per square inch and a temperature of 20° C. will require an absolute pressure in the kiln at the sealing temperature of 810# absolute. By maturing the insulators at this pressure and regulating or controlling the pressure in the kiln in accordance with the absolute temperature the insulators will be cooled without subjecting them to stress due to an unbalanced pressure on the walls forming the pockets. As ceramic materials are very strong in compression an excess of pressure over that called for by the absolute temperature usually may be applied to advantage while the ware is cooling.

Due to improved characteristics the maturing of the ware at increased pressure is of considerable economic importance. Insulator designs may be readily made in which an air density many times normal may be used without exceeding safe working limits for the material. Increasing the density of the air or gas in the pore spaces and sealed pockets to ten times normal will increase the dielectric strength from 30 kv. per centimeter to 300 kv. per centimeter. Since most ceramic dielectrics such as porcelain or glass will fail at values usually less than 100 kv. per centimeter, it is readily seen that the use of pockets or pore space under increased density of the air or gas can be used to increase the dielectric strength and improve the reliability. While this in itself is a very great advantage, there are other advantages which may be even more important.

With my improved method it is possible to improve the dielectric strength by properly located pockets and pore spaces so as to reduce the strain in the solid dielectric at points of high flux density. In addition the location of pockets makes it possible to substitute air or gas spaces for the solid dielectric so as to control the breakdown of free air adjacent to electrodes or metal parts attached to the insulators.

One advantage in increasing the density of the air or gas in the pore spaces or pockets is seen from a discussion of the following.

When the insulator is placed under dielectric stress the air may become ionized and act as a conductor. This is more readily seen by reference to Fig. 3. In Fig. 3 electrodes 15 and 16 are placed on opposed sides of a dielectric member 17 which has an internal fault 18, and which has been fired in the usual way. Dielectric members such as porcelain or glass have much higher specific inductive capacity than air, therefore the resistance to the passage of electrostatic flux through the dielectric is much less than through air. This concentrates the stress upon the fault 18. Since the density of the air or gas in the fault 18 is relatively very low compared to normal atmospheric density, the air is readily ionized and acts as a conductor. The discharge in the fault is somewhat in the nature of that of a discharge in a Geisler tube or in a tube at reduced air density.

Under alternating current a discharge tends to flow under each alternation. The heat generated by discharges in similar defects is responsible for the destruction of some insulators particularly where the insulator is subjected to stress at increased voltage and frequency. A further disadvantage is that the benefit due to the wide separation of the electrodes 15 and 16 is lost due to the fact that the capacitance is materially increased due to the flow of current in the fault 18. This tends to start a streamer or discharge 19 from the electrode 15 at a much lower voltage particularly when the member 15 is positive or allows the piece to fail by puncture.

The shunting effect of streamers which is materially increased due to an increase in the charging current as in Fig. 3 is very effective in causing puncture or in reducing the flashover voltage of bushings and other types of insulators particularly where the working stresses are high or where the insulators are working under fog conditions.

The air spaces or porous cores, which generally constitute a limitation for the casting method as applied to insulators, can be used to advantage by applying my improved method of firing. This will be more reasily seen by reference to Fig. 5. In Fig. 5 dielectric members 20 and 21 are separated by an air space 22. Electrodes 23 and 24 are used to apply voltage. Neglecting fringe effects the dielectric fields or lines of force passing through the dielectric between the two electrodes will be proportional to the voltage and the specific inductive capacity of the dielectric, and inversely proportional to the thickness of the dielectric or separation between electrodes. Porcelain has a specific inductive capacity of approximately six times that of air. It is therefore seen that the inclusion of an air space 22 will greatly reduce the flux passing through the dielectric. This reduction in dielectric flux makes it possible to greatly increase the voltage before shunting streamers 25 will start over the surface. However, since the stress upon the dielectrics in series will be inversely proportional to their specific inductive capacities and directly as to their thickness, it is readily seen that the air space will carry a large part of the electrical stress or strain. It is therefore necessary that the dielectric strength of this air space be sufficient so that it will not break down under the applied voltage.

With one-third of the distance between the electrodes filled with air the relative capacitance will be reduced from 2 to 0.75. This will result in a reduction in the electrostatic flux of over 73% and permit of a much higher applied voltage before shunting streamers will start from the electrodes. However, it is evident that since the relative stress carried by the dielectrics will be proportional to the thickness and inversely proportional to the electrostatic capacity, the air gap will carry approximately three times as much stress as the solid dielectric. It is therefore evident that unless the dielectric strength of the air or gas space is increased, the substitution of air or gas for the dielectric will produce a dielectric weakness which may cause failure. While it is readily seen that the inclusion of the air space has very great economic possibilities when applied to the design of insulators, it is necessary to provide sufficient dielectric strength in this air space. This dielectric strength is readily obtained by firing the insulator under an increased pressure at the time the walls surrounding the air space or pockets become impervious or are sealed.

Fig. 4 shows the principle applied to a high voltage bushing. In the bushing the dielectric member 26 has an outer shell and an inner tubular member enclosing a pocket 27. The bushing is equipped with metal mounting flange 29 of the usual type and a conductor 29'. The design is such that it may be readily formed by a casting method. The pocket 27 provides an effective space of low flux carrying capacity. This reduces the electrical stress upon the solid dielectric members and the tendency for streamers to flow over the outer surface is greatly reduced. This makes it possible to raise the arcing or operating voltage of the insulator. The pocket is particularly effective in reducing the shunting streamers or corona over the surface below the flange, which tends to cause radio interference. The inclusion of the pocket therefore makes it possible to operate a bushing of a given size or diameter at a higher voltage.

While in many cases the pockets containing air or gas are readily formed in the casting process and constitute a limitation with the present methods, there are cases where it may be desirable to form a part or all of the pocket or porous space by means of cores which may be made up in various ways. These cores may be made of absorbing material such as paper pulp, or of material which will soften during the forming operation and permit shrinkage of the walls without causing defects. The cores may be made of wax, a combination of ceramic materials mixed with organic materials such as wood, wood fiber, cork dust, meal, powdered wax, or various materials depending upon the results desired.

In Fig. 4 it may be desired to form a portion of the space very carefully, which is accomplished by using a core. This core is located by a pin 28. By making this pin of material similar to that used in the body composition and coating it with a glaze and impregnating it with wax it will support the core during the forming operation. During the firing operation it will fuse to the wall and form a tight seal. In other words the pins 28 act as chaplets in supporting the cores as in ordinary foundry practice. The portion projecting outwardly from the wall is readily removed by chipping or grinding.

In some cases pre-formed ceramic inserts or cores are placed in the piece during the forming operation, in which case means for locating the core may be omitted. In other cases small locating pins or needles can be used which are readily withdrawn during or after the piece is formed and the holes filled with glaze or slip which will form a tight seal during the firing operation.

In order to accomplish the desired results a special form of kiln or furnace shown in Fig. 1 has been devised. This kiln has a metal jacket 30 and heads 31 and 32. These are so joined by bolts and other means that pressure may be controlled within the interior at all times. The chamber is lined with suitable refractory material 33. The refractory lining makes it possible to develop high temperatures in the interior and cut down the loss due to radiation. Various types of construction may be used depending upon the nature of the ware and pressures desired or part of the process to be carried out. A duct 34 is connected to the jacket of the kiln at suitable points. This duct is lined with refractory material 35 so as to reduce radiation and protect the metal.

In one method of operation air is forced in through a metal tube 36 which preferably is placed in the duct 34. A fuel such as gas is allowed to enter through the member 37. The gases of combustion are allowed to escape through the member 38 by regulating the valve 39. The incoming air and gases are regulated by valves connected to suitable sources of supply.

The arrangement permits of a circulation of the gases of combustion. The gases which escape through the member 38 preheat the incoming air which enters through the member 36, thereby conserving some of the heat. Porcelain bodies are made of fine materials and are relatively very dense so that gases enter and escape rather slowly unless there is some change in pressure. However, the pore space usually is from 25% to 30% of the volume, consequently if the pressure is made to fluctuate it is possible to produce a material breathing action. This has the advantage in that combined and free carbon in the body composition can be readily oxidized or removed as against normal firing conditions where there is little or no fluctuation in pressure. This fluctuation in pressure can be accomplished by raising the amount of incoming air or gases or regulating the rate of discharge. A relatively slight change in pressure if repeated will produce very beneficial results. This is particularly true where very porous materials are being fired.

The fluctuating process may be used to remove carbon from the body composition while the kiln is being heated by gas or other suitable fuel, or by electrical means. However, where it is desired to obtain high pressures at the point of sealing in order to provide sufficient dielectric strength in the pockets or spaces in dielectrics it is generally advisable to develop the highest temperature by electric heat. In Fig. 1 this is accomplished by closing the valves 39, 40, and 41. The resistance elements 42 and 43 are then heated by suitable transformers 44 and 45. Connections are made to the heating elements through suitable leads 46 which are insulated from the jacket 30 and form a tight seal so that pressure may be maintained. With this arrangement the desired pressure may be maintained by opening valve 47 which is connected to a suitable source of pressure. If desired special gas from the container 48 may be allowed to produce the necessary pressure.

The pressure may be fluctuated in order to produce a breathing action up until the time the sealing of the pore spaces in the body takes place. The rapidity with which the pressure may be changed will depend upon the density of the body composition and the amount of gas or air which must pass through the walls in order to equalize the pressure without damage to the articles. However, it is evident that by causing the pressure to fluctuate a breathing action may be set up which may be used to advantage. This breathing action may be used to change the nature of the atmosphere in the pockets or pore spaces, and consume combustible material in the body or pockets.

During the firing operation both free and combined water may be given off from the ware. This water vapor may constitute an appreciable part of the gas in the pockets or pore spaces at the time the vitrification or sealing of the pores takes place. This may not constitute any serious difficulty where the density of the gas and the amount of water vapor in the pocket is sufficiently low so that condensation will not take place in the pores or on the walls of the pocket for the normal operating temperature. The presence of water vapor may be serious in other cases, however. It is evident that where the density of the atmosphere in the pocket is increased condensation of water vapor may take place on the inner wall under normal working temperatures. While this condensed moisture may be used in certain cases to generate heat, the presence of the moisture may constitute a serious disadvantage where high dielectric strength and the control of the electrical field is desired. Water has a very high flux carrying capacity compared to dielectrics such as porcelain or glass and to air or gas—therefore a film of moisture condensed upon the surfaces may produce a material change in the electrostatic field. However, with my improved process it is possible to change the atmosphere in the pore spaces or pockets by fluctuating the pressure in the firing chamber before the sealing action takes place. After the free and combined water has been released from the material making up the structure of the insulators the atmosphere surrounding the objects may be changed and the pressure fluctuated so as to cause a breathing action and the scavenging of the entrapped vapor.

Where it is desired to fill the pockets or pore spaces with a special gas the pore spaces, pockets and the atmosphere in the kiln may be exhausted or operated at a materially reduced pressure, after which the special gas such as nitrogen, helium, carbon dioxide, or mixtures may be admitted. The fluctuating pressure therefore may be used not only to control the chemical action taking place within the body but to control the nature of the atmosphere within the pockets or pore spaces.

Where the ware being fired contains considerable carbon or combustible material either in the body or in the cores or spaces the gases of combustion may form such a large proportion of the included gas that scavenging is not necessary. In this case the percentage of oxygen may be increased in the furnace atmosphere so that the oxidation can be accomplished without changing the atmosphere in the kiln. It is evident that the method may be used to generate heat in articles being burned. This allows heat to be developed where most needed. By incorporating or including combustible material in the articles being fired it is possible to reduce the time of burning and to obtain greater uniformity, as well as other advantages.

Where it is desired to produce a rapid change in the atmosphere the line 60 is connected to an exhauster or vacuum pump. The temperature is maintained in the kiln and the rate of exhaustion is such that the ware will not be damaged by a sudden change in temperature or pressure.

While high pressures have the advantage in that there will be less tendency for the forming of bubbles or pore space in the glaze or body of the dielectric, there is a possibility that a high vacuum may be used in the sealing process where the dielectrics are such that they will not be damaged. Materials which have received the biscuit fire or which have been previously fired or formed generally can be raised to high temperatures in a much shorter time so that the material may be subjected to a high vacuum at the high sealing temperature without detrimenal effects. Dielectrics such as porcelain made up of several different parts may be fused together in this way and pockets sealed by glaze or fusible material. Glass insulators having pockets may be sealed by using a plug of fusible glass or glaze to seal an opening at the high temperature. Where the material is such that the time and high vacuum will not be detrimental, the density in the kiln may be lowered by connecting to a suitable exhauster. Where the materials are such that a very high vacuum can be reached during the sealing process, sufficient dielectric strength may be obtained in the spaces. The high temperature in the kiln or furnace is used to expand the gas, which greatly facilitates the obtaining of the high vacuum in the pockets or pore spaces in the material.

Owing to the difficulty of providing a uniform distribution of heat at a high vacuum and the difficulty of obtaining a sufficiently high vacuum so as to develop the necessary dielectric strength in the pocket, pressure generally is preferable to a high vacuum at least for the early stages of heating or curing.

In order to reduce heat losses due to the circulation of gases in the duct 34 the sand 49 is allowed to flow into the passage and shut off the circulation. With this arrangement it is seen that the temperature and pressure both can be controlled and the preliminary heating accomplished by combustion. A pyrometer 50 indicates the temperature and a window 51 also may be used with an optical pyrometer or for inspection. A pressure gauge 52 is used to indicate the pressure within the chamber.

Several different pieces of ware illustrating the application of the method are shown such as the bushing part 53. A bushing 54 which has been formed in two parts but which is being forced together by a weight 55 during the firing process is shown located on the same refractory shelf. 56 shows a large sleeve or baffle used for bushings. 57 shows a suspension insulator disc, and 58 is a pin type. The ware is placed on the shelves or in saggers while the head 32 is disconnected from the shell and in lowered position. The head with ware and supporting refractories is raised by the hydraulic ram 32' and the head 32 secured to the case 30 so as to form a tight seal.

Figures 6, 7, 8, 9, 10, 11, 12, 13, 14, 15, 16, 17:
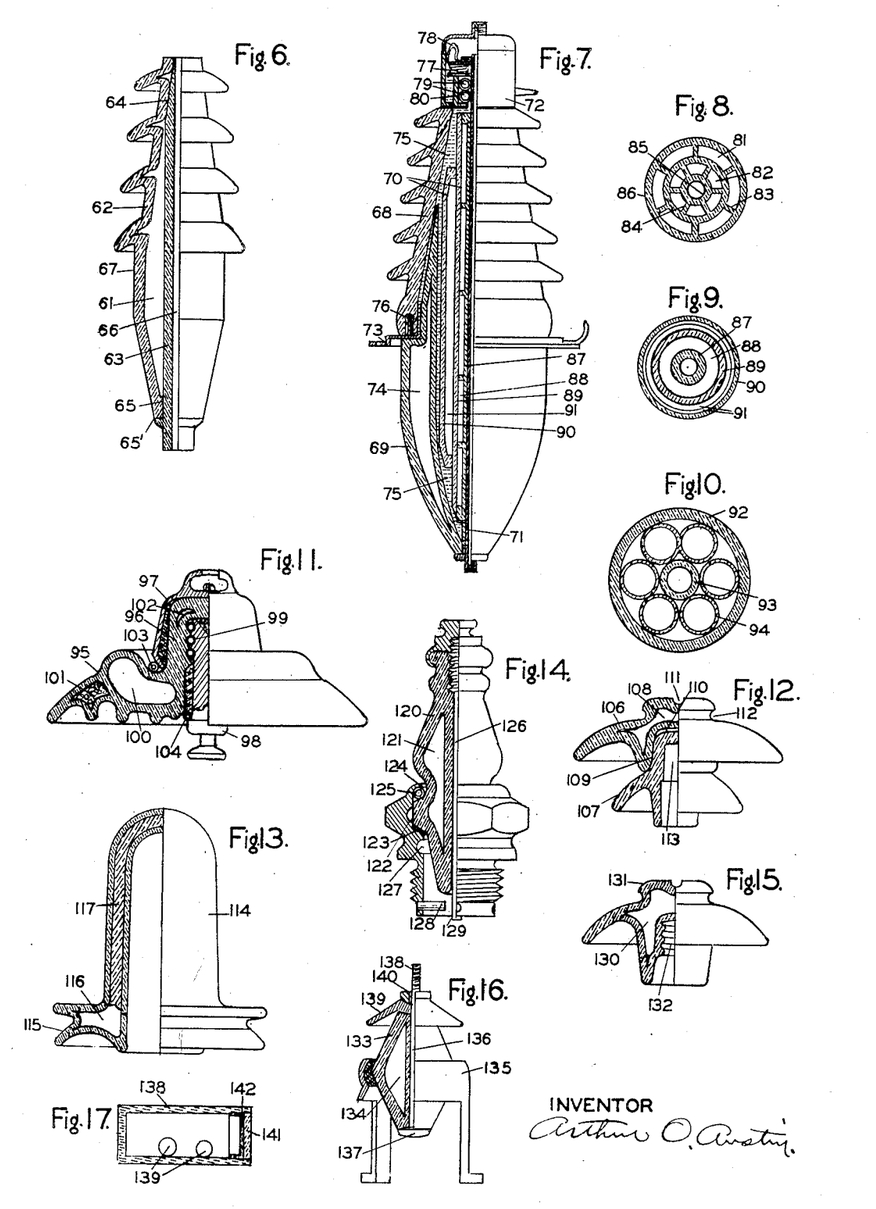
Fig. 6 is a part section, part elevation of the dielectric member for a high voltage bushing.
Fig. 7 is a part section, part elevation of a multi-part bushing.
Fig. 8 is a section through a sleeve or baffle for a bushing.
Fig. 9 is a section through a sleeve or baffle for a bushing.
Fig. 10 is a section through a sleeve or baffle for a bushing.
Fig. 11 is a part section, part elevation of a suspension or strain insulator.
Fig. 12 is a part section, part elevation of a pin insulator.
Fig. 13 is a part section, part elevation of a high voltage condenser.
Fig. 14 is a part section, part elevation of a spark plug.
Fig. 15 is a part section, part elevation of a pin type insulator.
Fig. 16 is a part section, part elevation of a radio tower insulator.
Fig. 17 is a section of a hollow brick or tile.

The improved method of manufacture has a number of important advantages when applied to insulators as will be seen by reference to the following figures:

Fig. 6 shows a high voltage bushing having a pocket or space 61 filled with air or gas under pressure. The design is such that it may be made in two parts consisting of an outer sleeve or case 62 and an inner tubular member 63. The outer and inner members are fused together during the firing operation at 64 and 65, or to the shoulder at 65', so as to make a sealed pocket 61. The hole 66 through the inner member allows for the passage of the lead, and a suitable flange may be placed around the straight portion or shank 67 of the outer sleeve.

The low flux carrying capacity of the space 61 reduces the stress on the solid dielectric members 66 and 62. In addition the corona point is materially raised, thereby increasing the working range or voltage of the bushing. The outer sleeve or case 62 is readily formed by casting, throwing, turning, or by any other suitable method. The inner member 63 may be formed by casting, throwing, or by extruding in the form of a tube, after which the tube may be turned or shaped as desired. Pieces of ware formed by the casting method generally have a higher firing shrinkage than pieces formed by the usual wet process. It is therefore easy to form a tight joint at the points 64 and 65 during the firing operation where the pieces have been previously glazed or fluxed over these surfaces. The greater shrinkage of the outer cast member causes it to shrink upon the inner so that the glazed joint will form an air-tight seal. Where shrinkage cannot be depended upon to produce a tight joint butt or tapered joints can be used to insure a tight seal. As the pieces are soft and readily distorted at the maximum temperature without producing a fault, considerable latitude is possible in making a tight joint even where the outer member has a much higher firing shrinkage than the inner member.

The gas tight pocket formed by glazing or fusing is of much value for some insulators as a relatively high air or gas pressure may be provided in the pocket so as to insure a high dielectric strength. The method has the advantage in that all organic insulation such as paper, varnished cambric and oil may be eliminated in the bushing and at the same time a bushing of high dielectric strength and rating for a given size can be produced.

Fig. 7 shows a multi-part high voltage bushing of the oil-filled type in which the dielectric members are made by the improved process. The bushing consists of an upper cone 68 with weather sheds and a lower sleeve 69 with an intermediate insulating baffle system 70. The bushing is provided with a tubular conductor 71, an expansion chamber 72, and a mounting flange 73 in accordance with the usual practice. The lower sleeve 69 is provided with a pocket 74. This pocket reduces the dielectric flux and the tendency for streamers to start from the flange 73 over the surface of 69. By providing a sufficient density of the air or gas in the pocket 74 the dielectric strength is materially increased. The pockets may be large or small depending upon the results desired.

In bushings it is common practice to wrap the conductor with paper, varnished cambric or other insulating material which has a lower flux carrying capacity than the porcelain. The use of a dielectric material which has a lower flux carrying capacity reduces the stresses, tending to cause streamers to form over the outside of the bushing. However, paper and varnished cambric are subject to deterioration and it is advisable to replace them by insulating members which have the necessary dielectric strength but which at the same time have a low flux carrying capacitance.

The member 70 is composed of several parts which include annular pockets. The several members are so made that they can be formed into one piece by fusing during the firing process. By vitrifying at a sufficiently high pressure in the kiln it is possible to provide a high dielectric strength for the air or gas in the spaces between the walls. It is necessary to provide good dielectric strength, otherwise the air or gas in the pockets will become ionized and break down under the electrical stress. The space between separate insulating systems is filled with oil 75 or other suitable insulating liquid or compound.

The upper cone is provided with an annular groove or pocket 76 to allow the insertion of a metal ring projecting from the flange 73. This tends to screen the electrostatic field, tending to cause a discharge over the surface starting from the flange. The arrangement also tends to reduce the stress upon the thin section of the insulating member 69. The several parts are held together by springs 77 acting through the conductor 71. The several springs preferably are used with some air space between. This reduces the magnetic flux set up by the current and allows a jumper 78 to make contact between the tubular conductor or current carrying system and the walls of the expansion chamber. If desired the helical spring members 79 can be used for carrying all or part of the current. The members 79 are forced into an annular groove formed by a rib or wall 80 of the expansion chamber and the conductor 71.

It is evident that a wide range of insulating members or baffles may be used to advantage with my improved method. Fig. 8 shows one form of baffle in which the spaces 81 and 82 are provided. The longitudinal ribs 83 and 84 preferably are staggered so that the electrostatic capacity will be reduced between the inner surface 85 and the outer surface 86. Members of this kind may be formed by the extruding process and the openings 81 and 82 closed while the material is soft, or by any other convenient method such as fusing or slipping.

Fig. 9 shows a different form of baffle in which a simple tubular member 87 is provided with annular spaces 88, the spacing flanges insuring the proper location of the tubular member 89 with respect to the central member 87. The inside diameter of the member 90 is less at the ends so that the space 91 will be properly located. The whole system may be formed by the usual methods used in forming ceramic wares and fused together in the kiln. By using body compositions for the outer members which have slightly higher shrinkages than the inner members it is not necessary to provide very close fits as the clearance will be taken up during the firing process. The glaze on the pieces will provide for any small irregularities and insure gas-tight pockets.

Fig. 10 shows a cross section of an insulating sleeve or baffle of somewhat different construction. A gas-tight pocket is formed by the outer sleeve 92 and the inner sleve 93 at the ends of the outer member 92. Dielectric spacing members 94 are used to maintain the proper relation between the inner and outer members, and to provide additional mechanical strength. The members 94 preferably are of light construction so that the amount of solid dielectric between the two main members will be relatively small. By glazing the surfaces of the inner and outer members or the spacer members 94 it is possible to fuse several members together during the firing operation. In place of tubular spacing members 94 other shapes of course may be used. If desired the space may be filled with fused or loosely packed dielectric pieces such as porcelain sand or other material. The amount of solid dielectric may be reduced by using a filling, part of which will burn out during the firing operation. Glass may be used for some of the baffles or insulating members, the pockets being sealed while the density and temperature is controlled.

Fig. 11 shows a suspension or strain insulator produced by the improved method. The insulator is composed of a dielectric member 95 having a head 96 for attaching a cap 97. The pin 98 is inserted in a suitable recess in the head of the insulator. The pin transmits stress to the head by means of cement or thru resilient members 99. The flange of the insulator is provided with an annular pocket 100 near the axis of the insulator, and an outer annular pocket 101. A small annular pocket 102 is provided in the head of the insulator to increase the dielectric strength at this point. The large outer pocket 100 reduces the stress tending to cause streamers to flow from the edge of the cap and pin over the surface. The wide separation between the upper and lower surface of the insulating flange with a pocket giving low capacitance reduces the current in charging streamers starting over the surface and raises the corona point. Since streamers have a very high negative coefficient of resistance a reduction of the current in these streamers materially reduces the shunting effect. The low stress allows an increase in the voltage at which corona will start, and the low capacitance between the two faces materially increases the arc-over voltage for the insulator. The improved performance is of a great economic value as it increases the effective arcing voltage and time lag for a given length or size of insulator. In addition to increasing the length efficiency of an insulator string composed of one or more sections, the reduction in surface charging current improves the performance of the insulator for fog conditions or for conditions where the insulator is affected by accumulations of dirt or conducting material.

As the insulators made by the improved process may be used for very severe conditions where leakage current is relatively high, special means are provided so that the cap 97 and pin 98 will not be damaged by the leakage current. Spiral guard rings 103 and 104 are placed in contact between the cap and upper face of the insulator, and between the pin and lower face of the insulator. These guard rings are in direct contact with the cap and pin so that any discharge or leakage streamer starts from the outer edge of the guard members rather than from the main members. By making the replaceable guard members of bronze or other suitable material corrosion will have little serious effect upon the insulator. By using these guard members it is possible to use steel caps and pins or malleable castings. Without the guard rings the heavy leakage current may cause the removal of the zinc, after which the metal parts will rust and shorten the life of the insulator. The improved construction makes it possible to operate the insulators under much more severe conditions than is possible with the ordinary types which have a high relative capacitance between the two faces particularly when the faces are wet by fog or have conducting deposits. The wide separation between the two faces without including large masses of solid dielectric reduces the capacitance and the shunting effect of the streamers. The thinner walls reduce the absorption of heat, which reduces the condensation during fogs or periods of high humidity. This is of great advantage over that where heavy solid parts are used.

Since the process makes it possible to design and manufacture insulators of greatly improved electrical characteristics, these can be used to improve the insulation of suspension insulator strings so as to provide more insulation for a given length of insulator. The improvement in the insulation is particularly valuable where the improved insulator can be used to reduce the length of the string and clearance in the tower. By increasing the effective flashover and corona point for the insulators subjected to the greatest electrical stress it is possible to materially increase the operating voltage for the string without producing over-stress or radio interference. The method can be used to increase the ratio of flashover voltage to the voltage duty for the several members making up an insulator so as to improve the string efficiency. An improved stress distribution or gradient in the string may be used together with the improved flashover voltage for some of the members to further increase the efficiency. The process makes it possible to increase greatly or decrease the capacitance through the head of the insulators which in turn can be used to improve the gradient or stress upon the several members.

The methods which are used for the formation of the insulator in Fig. 13 may be used for the forming of suspension members as shown in Fig. 11. In this case the head portion is formed with all or part of a material which has a greater flux carrying capacity. Such compositions are readily made which include a large portion of titanium oxide.

The dielectric strength through the head of the insulator should bear some relation to the flashover voltage of the disc or member. Since the invention permits of the design and manufacture of insulators having higher effective flashover voltages, it will be seen that it may be advisable to increase the dielectric strength or puncture voltage for the heads of insulators which are under maximum stress. This may be accomplished by the use of glands or pockets at the points of greatest stress such as that in the corner of the pin hole. By using a suitable pocket 102 the flux tending to break down the inner corner of the pin hole is materially reduced. This construction makes it possible to reduce the size of the head or increase the dielectric strength and thereby improve the design.

Various methods are available and a wide range in design may be used depending upon the results desired. The pockets in the insulator may be entirely filled with loose material such as that in 101. By partially forming the piece and then placing cores or inserts in position the material may be formed over same so as to provide an enclosed pocket. As previously explained this material may be melted out if in the form of wax, or burned out during the firing operation. In some cases freshly formed cast or formed inserts having a composition similar to that in the main body may be used. This form of insert is particularly applicable to cast ware, a modified method being used in the production of sanitary ware.

Fig. 12 shows a multi-part pin insulator of improved properties manufactured by the improved process. The insulator consists of a top 106 and a shell or center 107. The top has a pocket 108. The pieces are so formed that they will be fused together at 109 during the firing operation. The shape of the pieces is also such that an additional pocket 110 is provided between the two parts. It is evident that the pockets will greatly reduce the electrostatic flux passing between the conductor which fits in the upper groove 111 and the tie wire groove 112, and the pin which fits into the pin hole 113. This reduction in stress will materially increase the voltage at which the insulator may be operated without producing streamers or radio interference. Since there is a wide separation between the two surfaces with the intervening space, the tendency for streamers to form over the surface will be greatly reduced. This is accomplished without producing excessively thick or heavy parts with their high thermal stress. By properly designing the insulator the pockets may be of such form that considerable resiliency and relief will be provided for different rates of expansion in the outer and inner portions of the insulator. In addition the electrical properties of the insulator will be materially improved. The pockets in the insulating members may be applied to any one or all of the various members as desired. The method is particularly applicable to large multi-part insulators and to certain types of post insulators.

Due to the low capacitance and the negligible dielectric loss in the pockets, insulators using the pockets can be used at much higher frequencies and voltage without serious heating. When used at high frequencies the insulators are designed so that the pockets carry a large part of the dielectric stress so that the hysteretic loses in the solid dielectric will be reduced to a small figure and therefore constitute a small loss.

In Fig. 12 the top member may be readily formed by a casting process, and the center or shell by any of the usual wet process methods of forming. Since the firing shrinkage of the cast piece is normally much higher than that for the center formed by the usual wet process method, the top will shrink onto the center and form a good bond between the two. While fused insulators have very desirable electrical properties due to the elimination of cement or conducting material, they frequently caues trouble due to dielectric breakdown.

When fired in the ordinary way pockets formed in the glazed joint between the two pieces have low air density and dielectric strength for reasons previously explained. However, with my improved process this weakness is eliminated and pockets or spaces in the joint may be used to advantage to obtain dielectric strength and to avoid dunting.

Fig. 13 shows an electrostatic condenser having a head 114 and a flange 115 with a pocket 116. With my improved process it is possible to make use of large and difficult shapes formed very readily by the casting process. With my improved process it is not necessary to match the curing temperatures or temperature of vitrification very carefully where it is possible to maintain or control the density in the pore space within the dielectric member subject to electrical stress. In Fig. 13 the head of the condenser is formed with an outer and inner wall of dense material such as a normal insulator porcelain. The intervening space 117 is filled with a composition which has a high specific inductive capacity such as a composition containing a large percentage of titanium oxide. Where the walls are rather thin which surround the core 117 the capacitance of the condenser may be greatly increased by the use of suitable core material even though it is porous. By matching compositions which have proper maturing temperatures the entire head may be made up of a material having high specific inductive capacity as well as the flange portion 115. From the previous explanation it is apparent that a high specific inductive capacity in the weather sheds is a decided disadvantage. However, the inclusion of the pockets such as 116 reduces the effect of the high capacitance and the process therefore is of very great advantage where the whole condenser is made up with material having a high specific inductive capacity. Since material having a high specific inductive capacity is more difficult to form and costs several times that of other compositions used for insulators, it is desirable to confine the material having high specific inductive capacity to the head 114 or portion which will increase the capacitance of the condenser or insulator, and to use ordinary porcelain or ceramic material having the usual characteristics for the remaining portion 115.

It is comparatively easy to form a condenser insulator having a core 117 by removing the slip when the desired wall thickness is obtained and replacing same with the special composition. Another method is to form the outer layer in any of the usual forming processes used in the manufacture of wet process insulators after which the layer of special material having high flux capacity may be formed in place, or if desired the whole head may be formed of the material having high flux carrying capacitance and the flange 115 with pocket formed with regular material of lower specific inductive capacity. The pocket 116 may be formed by using a suitable insert or by any one of several methods.

It is evident that the general construction shown in Fig. 13 may be used for the suspension insulator of Fig. 11 so as to increase the capacitance of the insulator without reducing the flashover voltage or corona point. The improved gradient will make it possible to increase the string efficiency. With the improved process the head and core may have considerable pore space without affecting the dielectric strength. The high capacitance and good dielectric strength therefore may be produced without necessarily forming an entirely dense mass. It is evident that the elimination of discharge in the pore spaces will decrease the losses at high frequency and therefore materially reduce the power factor.

Fig. 14 shows a spark plug, the dielectric member of which is formed by the improved process. The improved process makes it possible to provide a spark plug having greatly improved characteristics. Fig. 14 shows only one of a number of different forms to which the process may be applied for obtaining an improved result. In Fig. 14 the dielectric 120 having a pocket 121 is sealed against the shoulder of the gland 122 by means of a gasket 123. The upper portion of the nut has an annular ring 124 which is crimped against a resilient member 125. The pressure exerted insures a tight contact between the porcelain and the gasket 123 at all times. The use of the resilient member 125 makes it possible to take up differential expansion and also limits the stress which may be placed upon the dielectric member.

In the operation of spark plugs it is advisable to maintain a high insulation both inside and outside in order to withstand the high voltage impressed upon the plug. The high frequency or oscillating potential which is placed upon the plug not only requires high dielectric strength in the plug but tends to cause the flashover of either the inner or outer end. The flashover of the surfaces is aggravated due to accumulations of moisture or dirt. The outer end is also likely to flashover if high voltages are applied at high altitudes where the air density is low. The high pressure on the inside of the cylinder tends to prevent discharge over the inner surface but the flashover on the outside cannot be controlled.

When the spark coil is so attached that the highest voltage upon the center conductor 126 is negative, a positive streamer can readily build up over the outer end starting from the flange. As ordinarily formed the spark plugs have much less danger of flashing over the outer surface when the highest voltage impulse upon the inner member is positive. However, under this condition the tendency to discharge from leads and between the firing points starts at a lower value and is less effective. However, by using the improved process to form a plug with a pocket it is possible to greatly increase the effective arcing voltage over the outside of the plug as well as on the inside when the center member is negative. The reduced stress upon the surface due to the pockets and wide separation between inner and outer surfaces tends to reduce the effect of a shunting streamer and therefore the plug may be subjected to higher effective operating voltages without discharging over the surface. This higher voltage permits of wider gap spacing so there is less danger of missing due to the wide separation of points or from or from oil preventing discharge.

Due to the fact that shunting streamers tend to reduce the arcing voltage over the outside of the ordinary plug, the efficiency is improved by the use of small inner members. This greatly concentrates the stress upon the inner surface and owing to the small cross section of electrodes the heat conduction is limited. Where a small member is used the arcing between the points causes a rapid burning away and lengthening of the gap so that plugs may fail after a short period of operation. However, the improved construction permits of larger internal members without producing low flashover voltage. The large members may be used to control the conduction of heat and temperatures of the insulating surfaces, and in addition provide large electrodes which will give longer life. The pocket may extend well down into the plug so that the exposed inner surface near the gasket 123 will operate at a higher temperature and therefore tend to remain in better condition. This may be further improved by the use of a pocket 127. It is, therefore, seen that the pocket 121 not only makes it possible to obtain much better electrical characteristics for the spark plug but the temperature of the surfaces may be controlled by the use of pockets which will change the heat conduction and temperature of the adjacent surface.

The method also makes it possible to form the porcelain or dielectric members for spark plugs by a casting method. Any porous portions or spaces within the plug will not be detrimental but may be used to advantage with the improved process. With methods heretofore in use the porous spaces or voids within the dielectric members constitute a weakness and are therefore a limiting factor in the use of the casting process. In the casting process it is relatively easy to grade the composition throughout the wall, therefore, it is possible to change the composition for the inner and outer portions of the spark plug similar to that which may be used for the condenser in Fig. 13. By varying the casting composition the surface subjected to high temperature of fluxing can be of one composition backed up by a composition and structure giving the necessary dielectric strength. With the improved process it is possible to build spark plugs which will permit a much wider range in the size and shape of the firing points 128 and 129, as well as for increased potentials.

Fig. 15 shows a pin type insulator in which the process has been used to form an insulator having improved characteristics. The insulator may be made in a single piece by casting so as to provide a pocket 130 or the portions on the two sides of the pocket may be formed and fused together in the firing operation or while the material in the two parts is still plastic. However, the essential feature is the inclusion of the pocket between the head 131 and the pin hole 132 so as to reduce the capacitance and surface stress. The very effective reduction in the electrostatic flux due to the large pocket 130 which separates the two surfaces makes it possible to operate the insulator at a higher voltage without the formation of streamers over the surface. Insulators having these characteristics are particularly efficient where the frequency and voltage are high as well as for normal transmission work. The improved characteristics make the insulators valuable for carrier current circuits, for fog conditions, or where it is desired to use an insulator of minimum size. The pocket 130 may be formed in any convenient way as previously described, or if desired the pocket may be filled with relatively coarse particles which are fused together where they come in contact so as to provide increased mechanical strength with resiliency.

The use of the pocket is particularly valuable in preventing the destruction of insulators under operating conditions. When the sun shines upon the insulator heat is readily transferred to the inner portion due to the large outer surfaces and conductivity of the solid material. In the ordinary types of insulators the inner portion becomes almost as hot as the outer portion. If a cloud obscures the sun or a fall of rain strikes the insulator while hot, the outer portion is suddenly cooled and contracts upon the inner heated and expanded portion. The stress thus set up causes the destruction of many insulators after a few years operation. By including a pocket the conduction of heat between the outer and inner portions is greatly reduced, therefore the temperature and expansion of the inner portion is very much less than where the pockets are not used. Therefore if the outer portion is suddenly cooled the stress will be very much less so that the danger of cracking is materially reduced.

Fig. 16 shows an application of the process to an improved type of insulator used for sectionalizing or supporting radio towers, or for high tension strain insulators. The dielectric member 133 has a pocket 134. The dielectric member is cemented into the flange or supporting yoke 135. A central tension member 136 is provided with an enlarged end 137 and a threaded end 138 for attaching to the tower leg or tension member. The metal weather shed 139 is provided with a washer 140 which permits of alignment. The inner tubular portion of the dielectric surrounding the bolt 136 prevents discharge between this member and the inner surface adjacent to the flange. Where the dielectric member consists of two conical portions similar to that normally used for bus insulators and bushings, a discharge may readily take place when lightning strikes the radio tower. A discharge starting from the member 136 may puncture the outer wall of the dielectric member. The heat of the discharge may cause an explosion which will result in the failure of the insulator. However, with my improved process it is possible to provide greatly increased dielectric strength so that the danger of an internal discharge and puncture of the outer shell is removed.

Due to the great increase in dielectric strength and reduced flux it is possible to provide a much longer effective leakage path over the outside of the insulator for a given diameter. The double conical members with pockets made by the improved process have many applications such as that for spacers, for supporting center member in concentric conductors, for the insulation of bus bars, bushings, and many other items.

Portions of the process may be used to advantage in the firing of various types of ceramic materials such as tile, brick, stoneware, table ware, refractories, and sewer pipe. The application of the process to other materials will be evident from the following.

Fig. 17 shows a hollow tile or brick in the unfired state. The hollow shell 138 is formed in any suitable manner, after which the combustible material 139 is included. A paper or other form 140 is used to locate and hold the end 141 in place. Any suitable method can be used which will permit a good bond between the member 140 and 141 such as slipping, fusing or casting of the head.

The small amount of material required will permit of the use of much better types of material and a great reduction in weight for handling. By using a fluctuating pressure there will be a considerable breathing action due to the space inside the brick or tile. By controlling the atmosphere fuel may be consumed on the inside of the piece if desired so as to produce a more uniform temperature throughout the mass. By this means it is possible to greatly reduce the time of firing and use higher grade material for the brick or tile. Since the chemical condition of the atmosphere in the kiln and pore space can be readily controlled, it is possible to control the color of the brick or ceramic ware much more readily than where large solid masses are burned without the fluctuating pressure.

Due to the small amount of material the heat required for burning is necessarily reduced. The member 142 may be readily burned out during the firing process and will tend to furnish heat for the burning of the material. The use of combustible material within the piece is not necessary but with the fluctuating process it can be used to advantage as there will be but very small consumption of the material until a fluctuating pressure is produced. By using an increased pressure it is possible to raise the temperature rapidly even where the material contains free water and is quite dense, as the bursting action due to the formation of steam within the piece can be prevented. The increased pressure also controls the evaporation of water thereby reducing checking due to thermal stress.

The fluctuating pressure has material advantages in controlling the temperature and uniformity of heat distribution in the firing of ceramic material such as table ware. By varying the pressure before the sealing takes place it is possible to produce either an oxidizing or reducing condition throughout the body. It is also possible to provide a more uniform composition at different points in the kiln atmosphere insuring uniformity in color. Where the finishing is carried on at increased pressure the tendency for bubbles to form in the glaze and other defects will be materially reduced. Due to the greater density of the atmosphere convection currents will be more effective in transferring heat, which is a material advantage particularly in very large kilns. It is evident that it is comparatively easy to build kilns of fairly large size by using steel jackets where the fluctuating pressure is not very large. It is evident that continuous kilns may be used by providing suitable locking chambers at the entering and discharge ends.

The improved process has several advantages and can be used for producing many types of insulators such as bushings, link strains, X-strains, hollow post insulators, pot-heads, X-ray castings, and many other types of ceramic methods which cannot be applied at present but which have material advantages. It is evident that the control of pressure and breathing action can be used to material advantage in the production of brick or tile as a large portion of the heat may be produced in the ware, thereby making it possible to greatly reduce the time of firing and amount of fuel required for same. By controlling the density within the chamber it is evident that some dielectric members containing pockets may be sealed under a high enough vacuum so that the pocket will have the desired dielectric strength.

The addition of a small amount of whiting to the porcelain mix increases the toughness of the ware, but tends to increase the firing loss due to the formation of bubbles or bloat at the high temperature. The increased pressure during firing not only reduces the size and formation of the bloat but prevents electrical weakness in the small blebs or spaces. Where the outer wall (or surface) of the insulator is impervious due to glaze or fluxing, the body can be fired at a reduced temperature in order to obtain greater toughness as the necessary dielectric strength in the porous structure can be obtained by controlling the density at the time of sealing or firing.

It is evident that the advantage of the process may be obtained even where the density in the pockets is controlled by forcing in air or gas under pressure, or exhausting after the insulators have been removed from the kiln. The vent such as 12 in Fig. 2 can be sealed by any suitable material. One method is to use gold or platinum fused to the insulator around the vent, so that solder may be used for closing the vent. While it is possible to control the density in the large pockets by this method, the density in closed pockets such as 14 which do not connect with any duct system must be obtained in the firing operation. It is also difficult to place a vent so that the vent will not introduce a dielectric weakness. This is particularly true where the air density in a pocket is such as to constitute a weakness. With my improved process it is possible to provide walls of solid dielectric of good strength so that high effective insulation will be obtained even though the density in the pocket may not be such as to develop the highest dielectric strength. Difficult sealing operatings are avoided and the density in all parts of the structure can be provided for regardless of number, location, and size.

I claim:

1. The method of manufacturing ceramic ware articles comprising the steps of forming an article with an internal recess, and sealing the recess while the gas therein is at a pressure higher than atmospheric pressure.

2. The method of firing ceramic ware comprising the steps of subjecting the ware to a fluctuating pressure during firing causing repeated breathing of the gas surrounding the ware into and out of the body of the ware to produce a chemical reaction within the body of said ware.

3. The method of firing ceramic ware comprising the step of subjecting the ware to a fluctuating pressure during the firing causing passage of air into and out of the pores of the ware and oxidizing carbon within said ware.

4. The method of treating ceramic ware comprising the step of depositing oxidizable material in the body of said ware, firing the ware and subjecting the ware to a fluctuating air pressure during firing to produce a breathing action through the pores of said ware thus oxidizing said material.

5. The method of manufacturing ceramic ware comprising the step of enclosing a body of oxidizable material in a pocket in said ware and subjecting the ware to a fluctuating air pressure during firing to facilitate oxidation of said body to produce a supplemental heating of said ware and to leave a recess in the finished ware.

6. The method of manufacturing ceramic ware comprising the steps of forming the ware about a body of oxidizable material subjecting the ware to a fluctuating pressure while firing to facilitate oxidation of said material and sealing the material of said ware while subject to high pressure.

7. The method of firing ceramic ware comprising the step of fluctuating the pressure of the atmosphere in which the ware is fired causing repeated breathing of gas through the pores of the ware.

8. The method of firing a piece of ceramic ware having an internal opening comprising the steps of subjecting the ware to pressure during the firing operation, and sealing the material about said opening while said ware is under sufficient pressure to produce a gas density in said opening greater than the density of air at atmospheric pressure.

9. The method of treating ceramic ware comprising the steps of firing the ware under high gas pressure several times atmospheric pressure, and vitrifying the ware while subjected to said high pressure.

10. The method of manufacturing electric insulators from porcelain or like material comprising the steps of firing the porcelain under gas pressure several times atmospheric pressure.

11. The method of manufacturing insulators of vitreous material comprising the steps of heating the material while subject to gas pressure several times atmospheric pressure and vitrifying the material while subjected to such pressure, the pressure being great enough so that the density of any gas sealed off within the body of the insulator will be greater than the density of air at atmospheric pressure.

12. The method of producing insulators comprising the steps of forming pockets within the material of the insulator and firing the insulator under high pressure.

13. The method of treating ceramic ware comprising the steps of firing the ware so as to first remove the free and combined water and then completing the firing operation in an atmosphere at increased pressure greater than that employed during the removal of water.

14. The method of treating ceramic ware comprising the steps of firing the ware to remove water, carbon or other undesirable material, subjecting the ware to fluctuating pressure during such firing and then completing the firing operation under increased pressure greater than that employed during the removal of undesirable materials.

15. The method of treating ceramic ware comprising the steps of subjecting the ware to fluctuating pressure to remove water, carbon or other undesirable material by passage of the air to and from the pores of the material, and then completing the firing operation under increased pressure sufficient to produce a density of gas entrapped within the material when the material is vitrified, greater than the density of air at atmospheric pressure.

16. The method of firing ceramic ware comprising the steps of heating the ware to varying temperatures in an hermetically sealed kiln and maintaining a substantially constant atmospheric density for the varying temperatures during the firing operation.

17. The method of firing ceramic ware comprising the steps of sealing the ware at normal temperature in an hermetically tight kiln, raising the pressure of the atmosphere in said kiln above normal atmospheric pressure and raising the temperature during the final firing sufficient to hermetically seal any pockets within the ware to maintain the density of the gas within said pockets after said ware is open to atmosphere.

18. The method of forming an insulator having a pocket therein comprising the steps of sealing gas under high pressure within said pocket while said insulator is heated and maintaining external pressure on said insulator during the cooling of said insulator to prevent expansion of the gas in said pocket while the material of said insulator is yieldable.

19. The method of treating ceramic ware comprising the steps of subjecting said ware to repeated variations in the pressure of the atmosphere surrounding said ware thus producing repeated breathing of the gas of said atmosphere into and out of the body of said ware to free said ware of undesirable material in the body of said ware.

20. The method of treating ceramic body compositions, glazes or enamels to produce a better bond between the ware and the glaze or enamel, to prevent formation of bubbles or to reduce their size comprising the steps of firing said materials and subjecting them while heated to a gas pressure several times atmospheric pressure.

21. The method of treating glazed ware and preventing formation of bubbles therein comprising the steps of firing said ware and finishing off said ware at an increased gas pressure.

22. The method of manufacturing insulators comprising the steps of forming an insulator with an internal recess and sealing recess by fusion while the gas therein is at a pressure higher than atmospheric pressure.

23. The method of manufacturing vitreous or ceramic ware having a sealed recess therein comprising the steps of heating said ware and maintaining a pressure within and without said ware sufficiently nearly balanced to prevent deformation thereof during cooling.

24. The method of manufacturing vitreous or ceramic ware having a sealed recess therein comprising the steps of firing said ware under pressure greater than atmospheric pressure, sealing said ware and permitting said ware to cool with the pressure outside said ware sufficiently nearly balanced by the pressure within said recess to prevent deformation of said ware during cooling.

ARTHUR O. AUSTIN.